(12) United States Patent
Kempf et al.

(10) Patent No.: US 11,951,531 B2
(45) Date of Patent: Apr. 9, 2024

(54) METHOD AND DEVICE FOR PRODUCING A HOSE NIPPLE

(71) Applicant: ContiTech Techno-Chemie GmbH, Karben (DE)

(72) Inventors: Dominik Kempf, Frankfurt (DE); Harald Jung, Auenwald (DE); Eugen Kositza, Romrod (DE)

(73) Assignee: ContiTech Techno-Chemie GmbH, Karben (DE)

( * ) Notice: Subject to any disclaimer, the term of this patent is extended or adjusted under 35 U.S.C. 154(b) by 0 days.

(21) Appl. No.: 17/596,725

(22) PCT Filed: May 6, 2020

(86) PCT No.: PCT/EP2020/062500
§ 371 (c)(1),
(2) Date: Dec. 16, 2021

(87) PCT Pub. No.: WO2020/254033
PCT Pub. Date: Dec. 24, 2020

(65) Prior Publication Data
US 2022/0152688 A1    May 19, 2022

(30) Foreign Application Priority Data
Jun. 18, 2019 (DE) ............ 10 2019 208 854.6

(51) Int. Cl.
*B21J 5/12* (2006.01)
*B21J 5/02* (2006.01)
(Continued)

(52) U.S. Cl.
CPC ............... *B21J 5/12* (2013.01); *B21J 5/025* (2013.01); *B21J 13/025* (2013.01); *B21K 1/16* (2013.01); *B21K 21/12* (2013.01)

(58) Field of Classification Search
CPC .......... B21C 1/18; B21C 1/22; B21C 37/124; B21C 37/127; B21C 37/15; B21C 37/156;
(Continued)

(56) References Cited

U.S. PATENT DOCUMENTS 1,980,264 A   11/1934  Gielser
4,761,873 A   8/1988   Wetzel et al.
(Continued)

FOREIGN PATENT DOCUMENTS

CA    2058063 A1   6/1992
EP    0441174 A2   8/1991
(Continued)

OTHER PUBLICATIONS

International Search Report dated Sep. 10, 2020 of International Application PCT/EP2020/062500 on which this application is based.

*Primary Examiner* — Christopher J Besler
(74) *Attorney, Agent, or Firm* — Richard A. Wolf; Gregory J. Adams

(57) ABSTRACT

The invention relates to the production of profiled hose nipples. The invention was based on the object of providing a method and an apparatus which allow hose nipples of the type outlined in the introduction to be produced in a simple manner such that the formation of burrs is avoided and there is no reduction in diameter. This object is achieved in that during the forming of pipe portions (1) in the apparatus (2, 7, 9) according to the invention in the region of the subsequent ring-shaped webs (4) of the nipple profile (3), the material of the pipe portion (1), at its outwardly pointing end (4), does not come into contact with the tool in the region of the parting joints (6) of the apparatus (2, 7). This can be realized by additional cavities (14) in the tool (2, 7).

5 Claims, 1 Drawing Sheet

(51) Int. Cl.
*B21J 13/02* (2006.01)
*B21K 1/16* (2006.01)
*B21K 21/12* (2006.01)

(58) Field of Classification Search
CPC ........ B21C 37/205; B21K 1/16; B21K 21/12;
B21J 5/12; B21J 5/025
See application file for complete search history.

(56) References Cited

U.S. PATENT DOCUMENTS

| | | | |
|---|---|---|---|
| 7,237,424 B2 * | 7/2007 | Crutchley | B21K 1/60 |
| | | | 470/84 |
| 2012/0169045 A1 | 7/2012 | Berghaus et al. | |
| 2014/0116552 A1 * | 5/2014 | Kury | F16L 19/025 |
| | | | 285/330 |

FOREIGN PATENT DOCUMENTS

| | | | |
|---|---|---|---|
| JP | H01118333 A | 5/1989 |
| KR | 20010077486 A | 8/2001 |
| KR | 20010086610 A | 9/2001 |
| WO | 8606813 A1 | 11/1986 |
| WO | 2011029687 A1 | 3/2011 |

\* cited by examiner

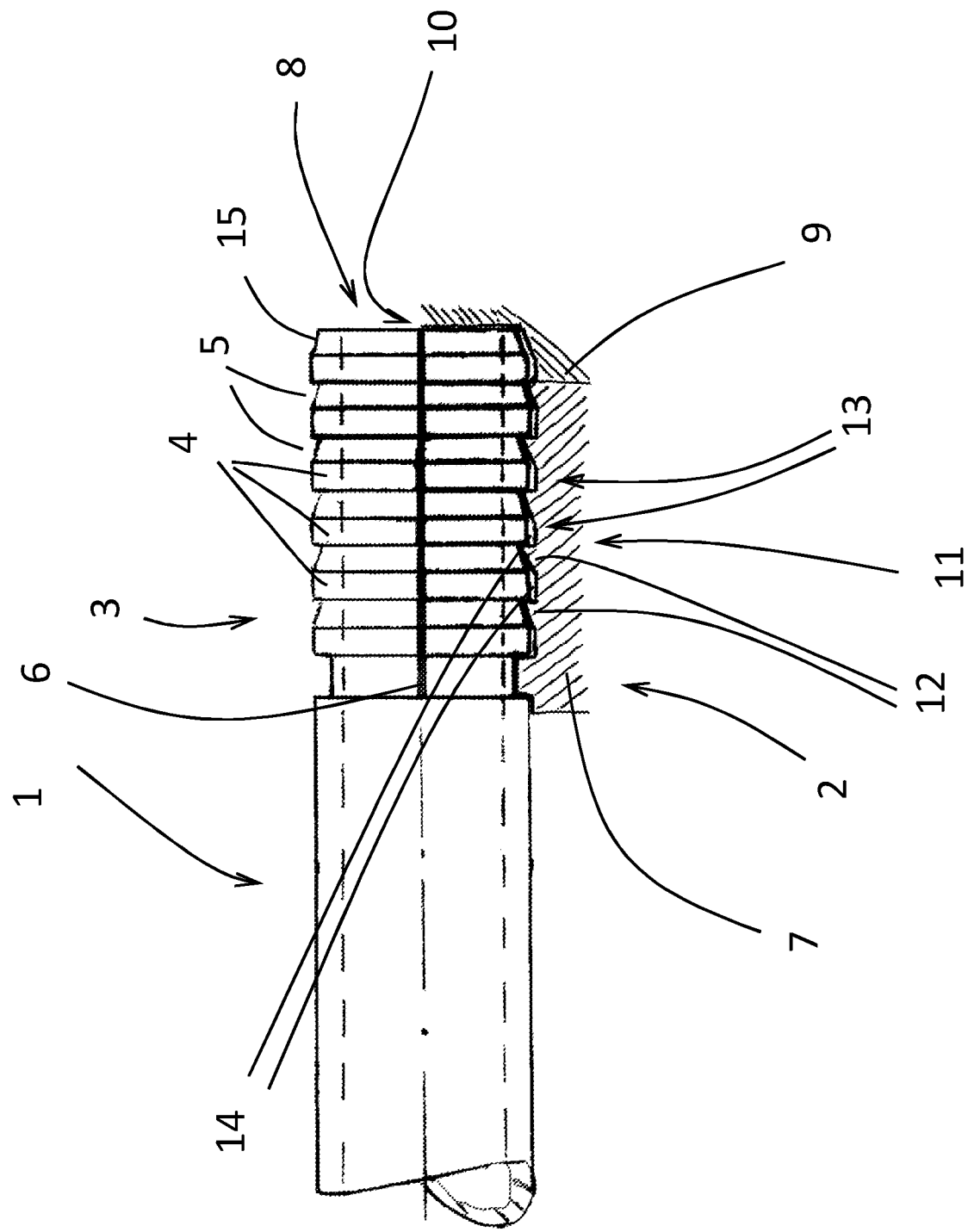

METHOD AND DEVICE FOR PRODUCING A HOSE NIPPLE

The invention relates to a production method for profiled hose nipples.

In fluid technology, hose nipples are usually used for plugged attachment of a flexible fluid line, for example a rubber hose. Since it is necessary to fix the fluid line on the hose nipple, hose nipples of this kind have an outer profile such that the outer profile can be pushed into the material of the fluid line, for example when the fluid line is being pressed on the hose nipple, with the result that a tight connection of the fluid line on the hose nipple is ensured, said connection being secured against slipping of the fluid line off from the hose nipple.

The hose nipples can be produced in various ways. By way of example, the nipple profile can be produced by turning, grinding, roller burnishing, hammering or pressing.

Machining entails the disadvantage that chips may be produced in the process, which have to be carefully removed or the parts have to be disposed of. Roller burnishing and hammering, like machining, are relatively time-intensive processes, with the machines requiring complex adjustment. The profile is produced in a chipless manner for example by hammering or roller burnishing. This often results in the formation of burrs which may damage a fluid line when the fluid line is being pushed onto the nipple.

WO 1986 00 68 13 A1 discloses a method in which a pipe end is deformed into an intended profiled shape by a reduction in diameter by cold working. In addition to the risk of burrs forming in this method, there is also the disadvantage here that the diameter of the pipe in the region of the nipple is reduced. This leads to a reduced flow in the region of the nipple, and so it may be necessary to make the entire pipe larger.

The invention was based on the object of providing a method which can be used to produce hose nipples of the type outlined in the introduction in a simple manner such that the aforementioned disadvantages are avoided and there is no reduction in diameter.

This object is achieved in that the method comprises the following working steps, specifically:
providing a divisible forming tool having at least two tool parts, wherein the tool parts each have at least one cutout, said cutouts forming an elongate cavity when the tool parts are assembled, wherein the cutouts are each profiled in such a way that when the tool parts are assembled, the elongate cavity has a profile of predetermined geometry with radially inwardly projecting ring-shaped webs and radially outwardly pointing ring-shaped grooves,
inserting a pipe portion into the elongate cavity,
pressing or drawing a forming punch into the pipe portion, wherein the forming punch is designed in such a way that when it is being pressed or drawn into the pipe portion, the diameter of the pipe portion increases and the material of the pipe portion is radially outwardly displaced into the profile of the elongate cavity, and that, in the region of the tool partings, a distance remains between the pipe portion material that is displaced into the radially outwardly pointing ring-shaped grooves of the profile and the tool wall,
opening the tool,
removing the pipe portion which has been formed into a hose nipple.

Because the diameter of the pipe portion is increased in the method according to the invention, there is no undesired throttling of a volume flow in the region of the hose nipple.

Corresponding harmonization of diameter, wall thickness of the pipe portion, the diameter of the forming punch and the depth of the radially outwardly pointing ring-shaped grooves of the tool profile makes it possible to adjust the material flow such that the material of the pipe portion flowing into the aforementioned grooves is not pressed against the wall of the tool. Therefore, on the finished hose nipple, burrs resulting from the parting of the tool can be found only in the regions in which the material of the pipe portion comes into contact with the tool, that is to say in the profile troughs of the hose nipple in the present case. In this way, the risk of damage to a hose occurring when the hose is being pushed onto the hose nipple is significantly reduced.

The invention was furthermore based on the object of providing an apparatus which allows hose nipples with an outer profile to be produced in a simple, rapid and inexpensive manner while avoiding the aforementioned disadvantages, without reducing in particular the inner diameter in the process.

This object is achieved in that the apparatus comprises at least the following components, specifically:
at least one at least two-part forming tool and at least one forming punch, wherein
the forming tool parts each have at least one cutout, and when the forming tool parts are assembled, the cutouts can form at least one elongate cavity which is suitable for accommodating a respective end of a pipe portion with a predetermined geometry, wherein
the elongate cavity has a profile which has radially inwardly projecting ring-shaped webs and radially outwardly pointing ring-shaped grooves, wherein
the radially outwardly pointing ring-shaped grooves have, at their end zone assigned to the outward direction, additional cavities at least in the region of the tool parting, and
wherein the at least one forming punch is designed in such a way that it can be pressed or drawn into the pipe portion, wherein the diameter of the forming punch corresponds to the predetermined geometry of the pipe portion in such a way that
when the forming punch is being pressed or drawn in, the pipe portion can be deformed to have a diameter greater than its initial diameter, whereby material of the wall of the pipe portion can be pressed outward, wherein the material that is pressed outward engages in the profile of the elongate cavity and can be formed into a shape, which corresponds to the profile, of the pipe portion in such a way that the material comes into contact with the inwardly projecting ring-shaped webs, and the material which is pressed into the outwardly pointing ring-shaped grooves penetrates the ring-shaped grooves in such a way that a distance remains between the material of the pipe portion and the tool as a result of the additional cavities.

An apparatus of this kind has the advantage that there is no reduction in diameter during the forming. The forming with the apparatus according to the invention takes place as cold massive forming, which entails good strength of the produced parts. A decisive factor in such a forming operation is that in spite of the use of a split tool and flash which is inevitably formed on the finished part, this flash is non-critical, since the profile of the tool is matched to the predetermined geometry and the forming punch in such a way that a burr is present only in the profile troughs of the finished part. By contrast, the outer surfaces of the profile webs that are necessary for sealing purposes do not have any flash. By virtue of the fact that, during the forming, the material of the pipe portion can indeed be pressed into the outwardly pointing tool grooves but the additional cavity arranged suitably thereon ensures that there is a distance between the tool and the pressed material in this region, the finished part has no burrs on the ring-shaped profile webs since the formed material of the pipe portion does not come into contact with the parting joints in the tool in this region.

In a refinement of the invention, the apparatus also has a ring-shaped forming tool part which is in the form of a non-split ring, wherein the opening of the ring can be pressed in an axially flush manner onto the pipe portion inserted into the elongate cavity of the split forming tool.

A ring-shaped forming tool part of this kind has the advantage that it can be used to form for example a threading aid on the pipe portion. Because the opening is in the form of a non-split ring, the problem of burr formation does not occur here.

An exemplary embodiment of the invention will be discussed in more detail below on the basis of the drawing. FIG. 1 shows, in the upper part, a finished hose nipple 1 which is arranged in an apparatus 2 according to the invention in the lower part of the FIGURE. Forming of the hose nipple 1 has already been concluded in this illustration, and so a forming punch is not shown here.

The hose nipple 1 has a profile 3 which has ring-shaped webs 4 and profile troughs 5. In the illustration, the line 6 denotes a parting plane or a parting joint of the apparatus 2, the parting plane being illustrated rotated through 90° as a partial longitudinal section of the apparatus 2 in the lower part of the FIGURE.

In the region of the parting joint 6, the profile troughs 5 have burrs (not illustrated here). By contrast, the webs 4 do not have any burrs in the region of the parting joint 6.

The apparatus 2 shown in the lower part of FIG. 1 has 2 tool halves, of which only one tool half 7 is shown here as a partial section. Arranged in the end region 8 of the apparatus 2 is a further tool part 9 which has an opening 10 of closed ring-shaped form which opens conically in the direction of the inserted hose nipple 1.

The tool halves 7 have a virtually tooth-like profile 11 in section. Inwardly projecting teeth 12 alternate with radially outwardly pointing grooves 13 in an axial direction. Arranged at the respectively radially external end of the grooves 13 is a respective cavity 14 which is present only in the region of the parting joint of the tool halves.

During the forming of the hose nipple 1, which has already been carried out in this illustration, the original diameter of the pipe-like hose nipple 1 was increased, wherein the radial extent of the hose nipple 1 is delimited by the tool halves 7 and the further tool part 9. In this case, the increase in diameter is determined in advance such that the material of the hose nipple 1 can indeed be pressed into the profile 11 of the apparatus 2 but a distance between the hose nipple 1 and the apparatus 2 remains in the region of the cavities 14. This means that, in this region of the parting joint, the ring-shaped webs 4 do not come into contact with the tool at their axial end and thus no burrs can be produced in this region either. In this way, the crucial load-bearing webs 4 remain free of burrs, with the result that a tube (not shown here) capable of being pushed on can be pushed onto the hose nipple 1 without being damaged.

This is further improved by the formation of a burr-free run-on bevel 15 by means of the tool part 9.

LIST OF REFERENCE DESIGNATIONS

Part of the Description

1 Hose nipple
2 Apparatus
3 Profile of the hose nipple 1
4 Ring-shaped webs of the profile 3
5 Profile troughs of the profile 3
6 Parting joint
7 Tool half of the apparatus 2
8 End region of the apparatus 2
9 Further tool part
10 Conical opening of the tool part 9
11 Tooth-like profile of the tool half 7
12 Teeth of the profile 11
13 Grooves of the profile 11
14 Cavities at the axially outer end of the grooves 13
15 Run-on bevel

The invention claimed is:

1. A method for producing profiled hose nipples, the method comprising:
   providing an apparatus having first and second tool halves, each having a first region and an end region and defining a tooth like profile having projecting teeth and grooves;
   assembling the first and second tool halves and defining a cavity having the tooth like profile and a parting joint;
   forming a hose nipple using the assembled first and second tool halves where ring-shaped webs are formed without coming into contact with surfaces of the grooves of the tooth like profile to form the ring-shaped webs without burrs at least in the parting joint, and where a burr-free run-on bevel is formed on an end of the hose nipple by the end regions of the first and second tool halves;
   wherein each of the projecting teeth of the tooth-like profile of each tool half includes a semi-annular oblique surface that is inclined radially inwardly toward the respective end regions of the first and second tool halves,
   wherein the semi-annular oblique surfaces of the projecting teeth form annular oblique surfaces in the hose nipple that define annular tapered troughs between the ring-shaped webs,
   wherein all of the annular oblique surfaces of the hose nipple that are formed by the projecting teeth are inclined radially inwardly toward the end of the hose nipple having the burr-free run-on bevel, and
   wherein during the forming, burrs are formed on the annular oblique surfaces of the annular tapered troughs at the parting joint.

2. The method of claim 1, further comprising inserting a pipe portion into the cavity prior to forming the hose nipple, wherein at least part of the pipe portion forms the hose nipple during the forming.

3. The method of claim 2, wherein the forming the hose nipple includes displacing pipe portion material radially outwardly into the tooth like profile while maintaining a space between the pipe portion material and the surfaces of the grooves of the tooth like profile.

4. The method of claim 1, wherein each of the ring-shaped webs of the hose nipple has a radially outer surface that extends axially with a constant outer diameter.

5. The method of claim 4, wherein the projecting teeth of the tooth-like profile of each tool half forms radially inwardly extending surfaces in the hose nipple, the radially inwardly extending surfaces being perpendicular to a longitudinal axis of the hose nipple and connecting the radially outer surfaces with the annular oblique surfaces of the hose nipple.

\* \* \* \* \*